United States Patent [19]

Tobolski, Jr. et al.

[11] Patent Number: 4,959,851
[45] Date of Patent: Sep. 25, 1990

[54] DIALING FEATURES FOR CELLULAR TELEPHONE WITH STANDARD TELEPHONE SET

[75] Inventors: Francis P. Tobolski, Jr., Algonquin; Robert F. D'Avello, Hoffman Estates, both of Ill.

[73] Assignee: Motorola Inc., Schaumburg, Ill.

[21] Appl. No.: 349,731

[22] Filed: May 10, 1989

[51] Int. Cl.$^5$ .......................................... H04M 11/00
[52] U.S. Cl. ......................................... 379/59; 379/62; 379/63
[58] Field of Search ..................... 379/59, 61, 62, 63

[56] References Cited

U.S. PATENT DOCUMENTS

| | | | |
|---|---|---|---|
| 4,122,304 | 10/1978 | Mallien | 179/2 EB |
| 4,220,820 | 9/1980 | Mallien | 379/63 |
| 4,508,935 | 4/1985 | Mastromoro | 379/62 |
| 4,658,096 | 4/1987 | West, Jr. et al. | 379/59 |
| 4,718,080 | 1/1988 | Serrano et al. | 379/59 |
| 4,737,975 | 4/1988 | Shafer | 379/58 |
| 4,775,997 | 10/1988 | West, Jr. et al. | 379/58 |

FOREIGN PATENT DOCUMENTS

| | | | |
|---|---|---|---|
| 1175933 | 10/1984 | Canada | 379/62 |
| 60-200665 | 10/1985 | Japan | 379/63 |

OTHER PUBLICATIONS

Celjack Owners Manual-by Telular Inc. The Description and Specification GNTA Payphone Type AY4 (NMT) for Connection to a Mobile Radiostation in Accordance with the Specification for the Nordic Mobile Telephone Systems (NMT) by GNT Automatic A/S.
Motorola Instruction Manual No. 1S-SP134682, No. 68P81071E30, No. 68P81116E58.

Primary Examiner—Jin F. Ng
Assistant Examiner—Jhancy Augustus
Attorney, Agent, or Firm—Rolland R. Hackbart

[57] ABSTRACT

A unique cellular telephone (100) connects to a standard telephone set (101) for providing cellular telephone services to subscribers in remote locations not served by a landline telephone system. Cellular telephone (100) includes a cellular telephone transceiver (109), microcomputer (108) and circuitry (102-106) for interfacing the cellular telephone transceiver (109) to the telephone set (101). The interface circuitry (102-107) provides the audio, voltage and dial signal interface to the telephone set (101). The microcomputer (108) controls the interface circuitry (102-106) and is responsive to the telephone set (101) for answering and placing cellular telephone calls. The microcomputer (108) also is responsive to dialing sequences including numerical digits preceded and followed by the # digit for selecting cellular telephone features.

8 Claims, 7 Drawing Sheets

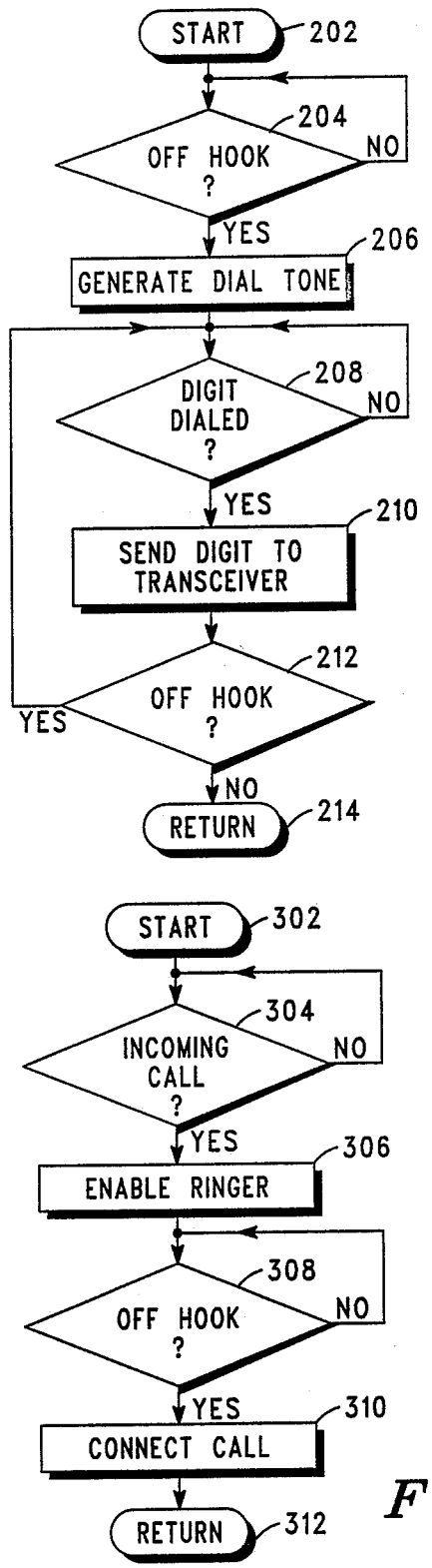
FIG.2
FIG.3
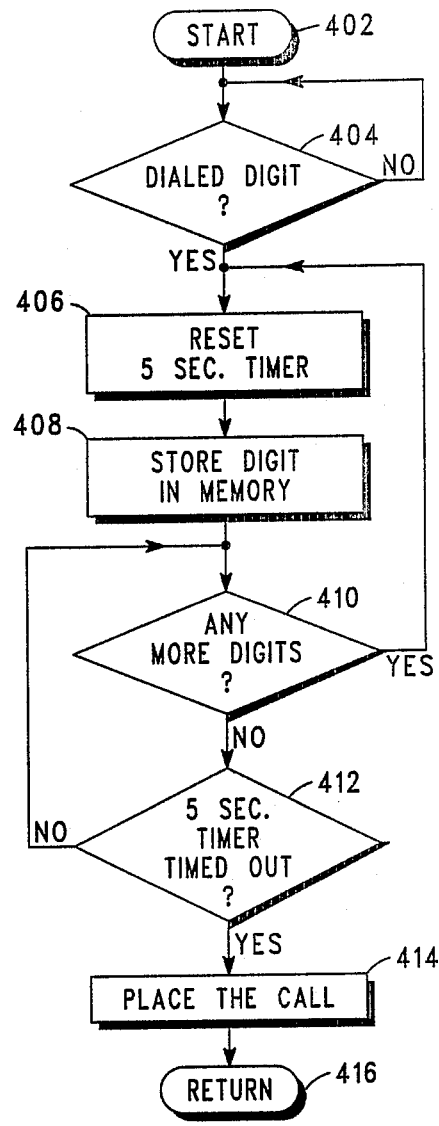
FIG.4

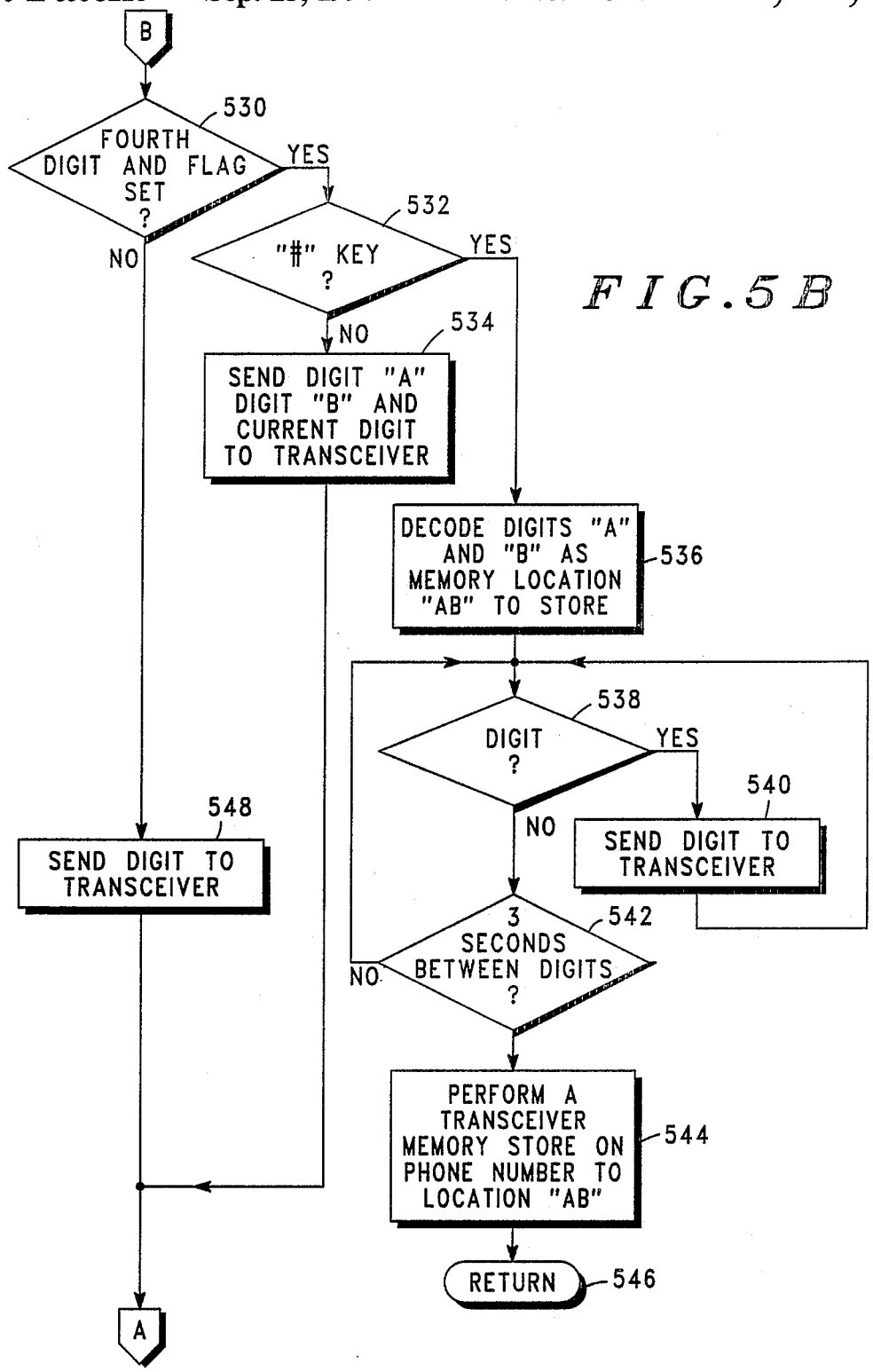

DIALING FEATURES FOR CELLULAR TELEPHONE WITH STANDARD TELEPHONE SET

BACKGROUND OF THE INVENTION

The present invention is generally related to radiotelephones, and more particularly to dialing features for a cellular telephone with a standard telephone set.

Cellular telephones currently are operated with a special purpose handset that is coupled via audio and data buses to a cellular telephone transceiver. Such cellular telephones typically include both a conventional twelve-key dial and three or more function keys. One function key is allocated to the "SEND" function for initiating a call once a telephone number has been dialed or selected from memory, and the remaining function keys provide optional features, such as, for example, volume adjust, transmit audio mute, automatic redial, memory store, and memory access. However, such features are not available to the user since the standard telephone set only includes a ten-key or twelve-key dial. For the foregoing reasons, there is a need for a cellular telephone with a standard telephone set which includes cellular telephone dialing features.

OBJECTS OF THE INVENTION

Accordingly, it is an object of the present invention to provide a unique cellular telephone with a standard telephone set or equivalent device, which includes cellular telephone dialing features.

It is another object of the present invention to provide a unique cellular telephone with a standard telephone set or equivalent device, which selects cellular telephone dialing features by dialing sequences using the # and * keys.

BRIEF DESCRIPTION OF THE DRAWINGS

FIG. 2 is a flow chart for the process used by microcomputer 108 in FIG. 1 for processing dialed digits of a telephone number.

FIG. 3 is a flow chart for the process used by microcomputer 108 in FIG. 1 for processing incoming telephone calls.

FIG. 4 is a flow chart for the process used by microcomputer 129 in cellular telephone transceiver 109 in FIG. 1 for receiving dialed digits of a telephone number and placing a telephone call to the dialed telephone number.

DETAILED DESCRIPTION OF THE PREFERRED EMBODIMENT

Figure 1:
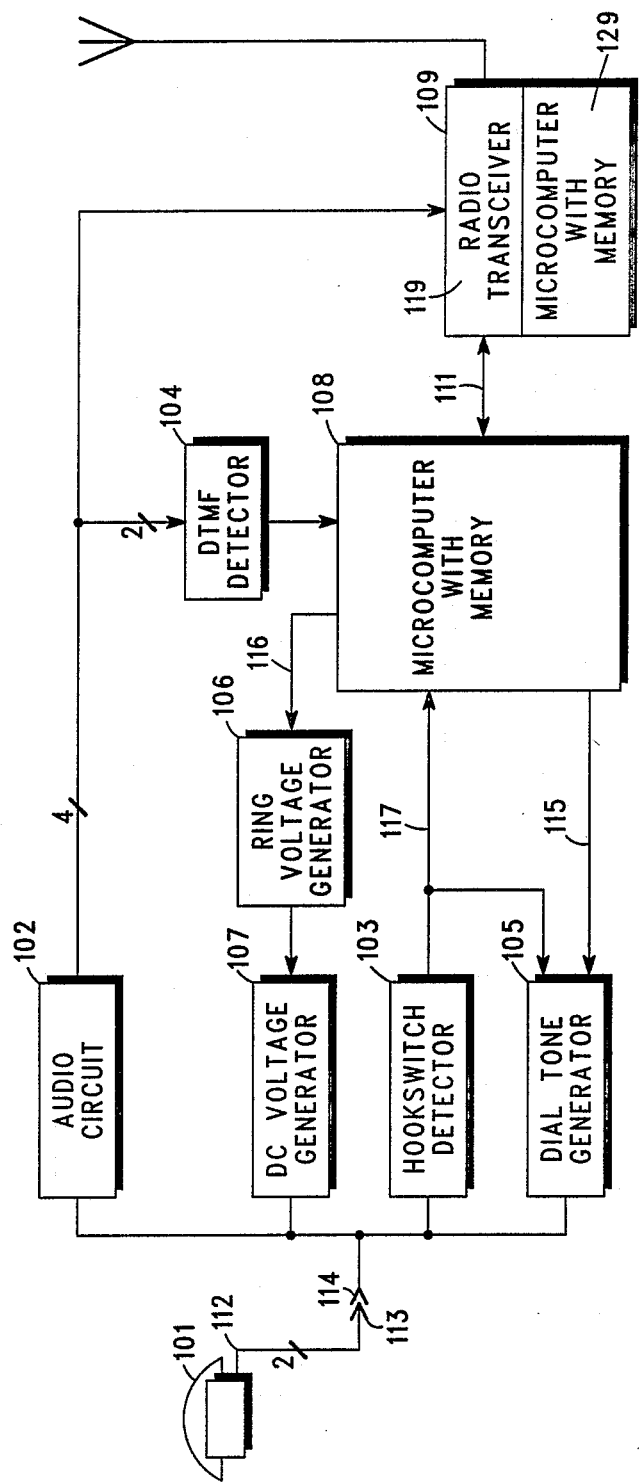
FIG. 1 is a block diagram of a cellular telephone 100 embodying the present invention, into which a standard telephone instrument 101 may be plugged.

Referring to FIG. 1, there is illustrated a block diagram of a cellular telephone 100 embodying the present invention, into which a standard telephone set 101 may be plugged. Cellular telephone 100 may be advantageously utilized in remote locations for providing cellular telephone services to subscribers who can not obtain conventional landline telephone service. Telephone set 101 may be a conventional telephone instrument or equivalent device having a tone dial with ten numerical keys 0-9 and two function keys # and *. For example, telephone set 101 may be a desk set, wall set, modem, or a separate dial, ringer and handset of the type found in a phone booth. In the case of pulse dial telephone sets, a hookswitch flash may be used as a function key. Telephone set 101 requires approximately twenty milliamps of operating current provided by cellular telephone 100 via two wires 112 typically referred to as "tip" and "ring" wires. Telephone set 101 also typically includes a modular RJ11C plug 113 which couple to corresponding modular RJ11C receptacle 114 in cellular telephone 100.

Cellular telephone 100 includes a cellular telephone transceiver 109 with a radio transceiver 119 and microcomputer 129 with memory therein for controlling the operation thereof. Cellular telephone transceiver 109 may be any conventional cellular telephone transceiver having a radio transmitter, radio receiver and logic unit, such as, for example, the transceiver shown and described in Motorola instruction manual number 68P81066E40, entitled "DYNATAC Cellular Mobile Telephone 800 MHZ Transceiver," published by and available from Motorola C & E Parts, 1313 East Algonquin Road, Schaumburg, Ill. 60196.

Cellular telephone 100 also includes blocks 102-106 for interfacing cellular telephone transceiver 109 to telephone set 101. Blocks 102-107 provide the audio, voltage and dial signal interface circuitry to telephone set 101 and may be conventional circuits of the type shown and described in Motorola instruction manual number 68P81071E30, entitled "THE CELLULAR CONNECTION Cellular Mobile Telephone Intelligent RJ11C Interface," published by and available from Motorola C & E Parts, 1313 East Algonquin Road, Schaumburg, Ill. 60196.

Voltage generator 107 generates a 48 V DC voltage which is coupled to wires 112 for supplying approximately twenty milliamps of current to operate telephone set 101. Ring voltage generator 106 produces a ringing signal having a high voltage at a rate commonly used in telephone systems and being coupled via voltage generator 107 to telephone set 101. The rate of the ringing signal produced by ring voltage generator 106 is controlled by microcomputer 108 via control signal 116.

Audio circuit 102 is an electronic bridge circuitry which converts the two-wire balance audio from telephone set 101 to four-wire unbalanced audio i.e., transmit and receive audio needed in a duplex telephone system. The four-wire unbalanced audio from audio circuit 102 is coupled to the radio receiver and radio transmitter of radio transceiver 119. The transmit audio from audio circuit 102 is also coupled to DTMF detector 104.

Hookswitch detector 103 detects the transition of telephone set 101 from "on hook" to "off hook" or vice versa and produces a hookswitch signal 117 having a binary zero state when telephone set 101 is on hook and a binary one state when telephone set 101 is off hook. During pulse dialing, the hookswitch signal 117 from detector 103 transitions from the binary one state to the binary zero state for each dial pulse. Hookswitch signal 117 from detector 103 is coupled to microcomputer 108 and dial tone generator 105. Microcomputer 108 monitors the hookswitch signal 117 from detector 103 to determine when telephone set 101 is off or on hook and to detect the digits of a pulse dialed telephone number.

Dial tone generator 105 is responsive to control signal 115 from microcomputer 108 and the hookswitch signal 117 from detector 103 for generating dial tone when telephone set 101 comes off hook. Dial tone is generated when the hookswitch signal 117 from detector 103 and control signal 115 from microcomputer 108 change to a binary one state. Upon detection of dialing, control signal 115 from microcomputer 108 changes from a binary one state to a binary zero state to shut off dial tone generator 105. In other embodiments, dial tone may be internally generated in microcomputer 108 and coupled to audio circuit 102 for application to telephone set 101.

DTMF detector 104 is coupled to the transmit audio from audio circuit 102 for detecting tone dialed digits of a dialed telephone number. Detector 104 may be a commercially available detector which translates dualtone multi-frequency (DTMF) tones into a four-bit binary equivalent which is coupled to microcomputer 108 for processing. To select between tone or pulse dialed digits, an input signal to microcomputer 108 may be coupled to a binary zero or binary one by a jumper wire or a user-programmable switch depending on the type of telephone set 101 coupled to cellular telephone 100.

Microcomputer 108 with memory therein controls blocks 105 and 106 and is responsive to hookswitch signal 117 and digits dialed from telephone set 101 for answering and placing cellular telephone calls. On receipt of an incoming call, microcomputer 108 enables ring voltage generator 106 for ringing telephone set 101. If a call is initiated by telephone set 101 coming off hook, microcomputer 108 decodes the following pulse or tone dialed digits and to forwards each digit on a real time basis to the microcomputer 129 of cellular telephone transceiver 109. Each dialed digit is stored by microcomputer 129. When microcomputer 129 detects the absence of dialed digits for a predetermined time, a cellular telephone phone call is automatically placed. Thus, there is no need to detect a specific number of digits (e.g. seven digits in local numbers and ten digits in long distance numbers) and no need to generate a "SEND" signal as was done in the prior art. As a result, cellular telephone 100 accommodates any dialing pattern regardless of the number of digits of the telephone number.

In the preferred embodiment, microcomputer 108 is coupled to microcomputer 129 of cellular telephone transceiver 109 by way of a three-wire data bus 111, which is illustrated and described in U.S. Pat. No. 4,369,516. Microcomputer 108 is essentially continuously looking for dialed digits and forwarding each digit on a real time basis to microcomputer 129. Each digit detected by microcomputer 108 is coded into a message and transmitted via bus 111 to microcomputer 129. Microcomputer 129 receives each dialed digit from bus 111 and stores the received digits in a pre-selected location of its memory. If another digit is not received in a predetermined time (five seconds in the preferred embodiment), the digits stored in the pre-selected memory location of microcomputer 129 are transmitted via the cellular radio channels by the radio transmitter of radio transceiver 119 for initiating a cellular telephone call.

Referring next to FIG. 2, there is illustrated a flow chart for the process used by microcomputer 108 in FIG. 1 for processing dialed digits of a telephone number. Entering at START block 202, the process proceeds to decision block 204, where a check of the hookswitch signal 117 is made to determine if telephone set 101 is off hook. If not, NO branch is taken to wait. If telephone set 101 is off hook, YES branch is taken from decision block 204 to block 206, where microcomputer 108 generates a binary one state of control signal 115 to generate dial tone. Next, at block 208, a check is made to determine if a digit has been dialed. If not, NO branch is taken to wait. If a digit has been dialed, YES branch is taken from decision block 208 to block 210 where a binary zero state of control signal 115 is generated and the dialed digit is coded into a message and sent via bus 111 to the microcomputer 129. Next, at decision block 212, a check of the hookswitch signal 117 is made to determine if telephone set 101 is still off hook. If so, YES branch is taken back to decision block 208 to repeat the foregoing process. If telephone set 101 is not off hook, NO branch is taken from decision block 212 to block 214 to return to other tasks.

Referring next to FIG. 3, there is illustrated a flow chart for the process used by microcomputer 108 in FIG. 1 for processing incoming telephone calls. Entering at START block 302, the process proceeds to decision block 304, where a check is made to determine if an incoming call has been received. If not, NO branch is taken to wait. If an incoming call has been received, YES branch is taken from decision block 304 to block 306, where microcomputer 108 generates a binary one state of control signal 116 to generate the ringing signal. Next, at decision block 308, a check of the hookswitch signal 117 is made to determine if telephone set 101 is off hook. If not, NO branch is taken to wait. If telephone set 101 is off hook, YES branch is taken from decision block 308 to block 310 to generate a binary zero state of control signal 116, connect the call and thereafter return to other tasks at block 312.

Referring next to FIG. 4, there is illustrated a flow chart for the process used by microcomputer 129 in cellular telephone transceiver 109 in FIG. 1 for receiving dialed digits of a telephone number and placing a cellular telephone call to the dialed telephone number. Entering at START block 402, the process proceeds to decision block 404, where a check is made to determine if a dialed digit has been received in a message via bus 111 from microcomputer 108. If not, NO branch is taken to wait. If a dialed digit has been received, YES branch is taken from decision block 404 to block 406, where a five-second timer is reset and started. In the preferred embodiment, a five second timer implemented by interrupt-based software is used to measure time elapsed since the last dialed digit was received. In other embodiments, such timer may be implemented by separate timing circuitry and may have a value which depends on operating characteristics of telephone set 101. Next, at block 408, the received digit is stored in a pre-selected location of the memory of microcomputer 129. Then, at decision block 410, a check is made to determine if another dialed digit has been received. If so, YES branch is taken from decision block 410 back to block 406 to repeat the foregoing process. If another dialed digit has not been received, NO branch is taken from decision block 410 to decision block 412, where a check is made to determine if the five-second timer has timed out. If not, NO branch is taken back to decision block 410 to check for receipt of the next dialed digit, if any. If the five-second timer has timed out, YES branch is taken from decision block 412 to block 414 where a cellular telephone call is placed to the number comprised of the digits stored in the pre-selected memory location of microcomputer 129, and thereafter return to other tasks at block 416.

Referring next to FIGS. 5A-5E, there is illustrated a flow chart for the process used by microcomputer 108 in FIG. 1 for processing dialing sequences using the # and * keys to select cellular telephone features that are pre-programmed in cellular telephone transceiver 109. According to the present invention, dialing sequences including numerical digits preceded and followed by the # digit, * digit or hookswitch flash may be used to select cellular telephone features. In the preferred embodiment, the # digit is used to select the cellular telephone features. For example, feature 5 may be selected by dialing the sequence #, 5, #. As explained hereinabove with respect to FIGS. 2, 3 and 4, a telephone number such as 576-5212 is dialed as the sequence 5, 7, 6, 5, 2, 1, 2, and is automatically transmitted on a cellular radio channel five seconds after the last digit is dialed.

In the preferred embodiment illustrated in FIGS. 5A-5E, the following features are provided:

| Sequence | Feature |
| --- | --- |
| #,0,# | Last number dialed |
| #,1,# | One minute beep timer |
| #,3,# | Automatic redial |
| #,4,# | Horn alert |
| #,5,# | Electronic lock |
| #,6,# | Transmitter mute |
| #,7,# | Call screening |
| #,8,# | Volume control |
| #,D1,D2,# | Memory store, where D1 and D2 are numerical digits |
| #,#,D1,D2 | Send # to cellular telephone transceiver as part of number |
| #,D1,D2,D3 | Ignore # and send digits to cellular telephone transceiver |

Although the features shown above include only one or two numerical digits, three or more numerical digits may be used in other embodiments where it is necessary to provide additional features. The foregoing features correspond to the features of the conventional cellular telephone described in the aforementioned Motorola instruction manual number 68P81066E40, which features may be selected by means of dedicated function keys, such as the lock, volume, recall, mute and store keys on a conventional cellular telephone control unit. The operation of such dedicated function keys of such conventional cellular telephone is described in further detail in the Motorola user's manual no. 68P81116E58-B, entitled "DYNATAC 6000XL Cellular Mobile Telephone User's Manual", published by and available from Motorola C & E Parts, 1313 East Algonquin Road, Schaumburg, Ill. 60196.

Referring next to FIGS. 5A-5E, the process illustrated corresponds to block 210 in FIG. 2. Entering at START block 502 in FIG. 5A, the process proceeds to block 504, where a dialed digit is received. Next, at decision block 506, a check is made to determine if the dialed digit is the first digit. If so, YES branch is taken to decision block 508, where a check is made to determine if the first digit is a # key. If so, YES branch is taken to block 512 where the feature flag is set, and thereafter the process returns to block 504. If the first digit is not a # key, NO branch is taken from decision block 508 to block 510, where the first digit is sent to radio transceiver 109, and thereafter the process returns to block 504.

If the dialed digit is not the first digit, NO branch is taken from decision block 506 to decision block 514, where a check is made to determine if the dialed digit is the second digit and the feature flag is set. If so, YES branch is taken to decision block 516, where a check is made to determine if the second digit is a # key. If so, YES branch is taken to block 518 where the # digit is sent to cellular telephone transceiver 109, and thereafter the process returns to block 504. If the second digit is not a # key, NO branch is taken from decision block 516 to block 520, where the second digit is saved in the A digit location of the memory of microcomputer 108, and thereafter the process returns to block 504.

If the dialed digit is not the second digit, NO branch is taken from decision block 514 to decision block 522, where a check is made to determine if the dialed digit is the third digit and the feature flag is set. If so, YES branch is taken to decision block 524, where a check is made to determine if the third digit is a # key. If so, YES branch is taken to block 526 where the stored A digit is decoded according to FIGS. 5C, 5D and 5E. If the third digit is not a # key, NO branch is taken from decision block 524 to block 528, where the third digit is saved in the B digit location of the memory of microcomputer 108, and thereafter the process returns to block 504.

Figure 5A:
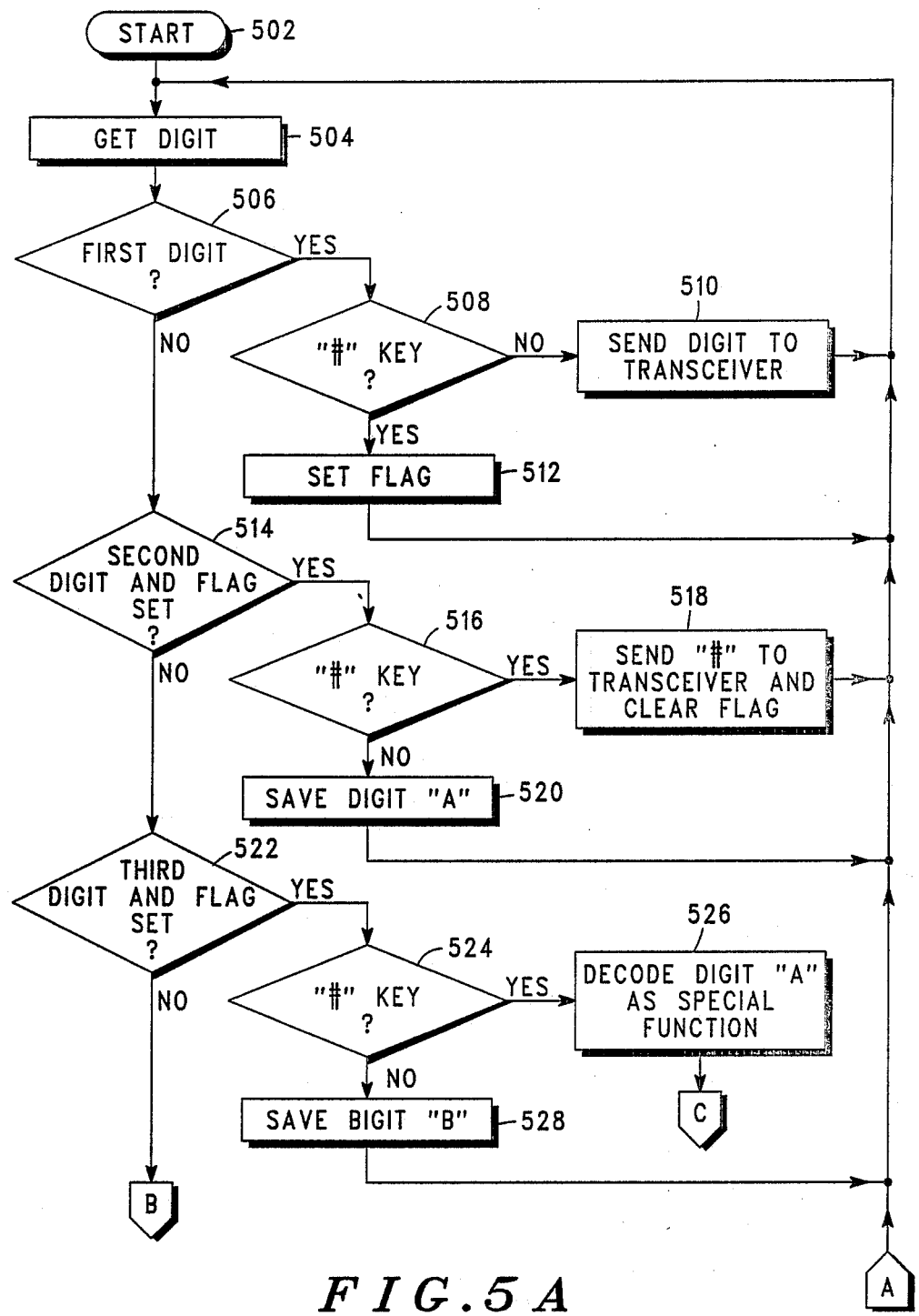
FIG. 5, including FIGS. 5A, 5B, 5C, 5D and 5E taken together, is a flow chart for the process used by microcomputer 108 in FIG. 1 for processing dialing sequences using the # and * keys to select cellular telephone dialing features.

If the dialed digit is not the third digit, NO branch is taken from decision block 522 in FIG. 5A to decision block 530 in FIG. 5B, where a check is made to determine if the dialed digit is the fourth digit and the feature flag is set. If the dialed digit is not the fourth digit or if the feature flag is not set, NO branch is taken form decision block 530 to block 548 where the dialed digit is sent to radio transceiver 109, and thereafter the process returns to block 504. If the dialed digit is the fourth digit and the feature flag is set, YES branch is taken from decision block 530 to decision block 532, where a check is made to determine if the fourth digit is a # key. If the fourth digit is not a # key, NO branch is taken from decision block 532 to block 534, where the stored A digit, stored B digit and fourth digit are sent to radio transceiver 109, and thereafter the process returns to block 504. If the fourth digit is a # key, YES branch is taken from decision block 532 to block 536 where the stored A digit and stored B digit are decoded as memory location AB in microcomputer 129 of radio transceiver 109. Thereafter, the following dialed digits are received and sent to microcomputer 129 of radio transceiver 109 for storage at memory location AB. Next, at decision block 538, a check is made to determine if another dialed digit has been received. If so, YES branch is taken to block 540 where the dialed digit is coded into a message and sent via bus 111 to microcomputer 129 of radio transceiver 109, and thereafter the process returns to block 538. If another dialed digit has not been received, NO branch is taken from decision block 538 to decision block 542, where a check is made to determine if a period of three seconds has elapsed since the last dialed digit was received. If not, NO branch is taken back to decision block 538 to repeat the foregoing process. If a period of three seconds has elapsed since the last dialed digit was received, YES branch is taken from decision block 542 to block 544 where a memory store message to location AB is coded and sent via bus 111 to microcomputer 129 of radio transceiver 109, and thereafter the process returns to other tasks at block 546.

Figure 5C:
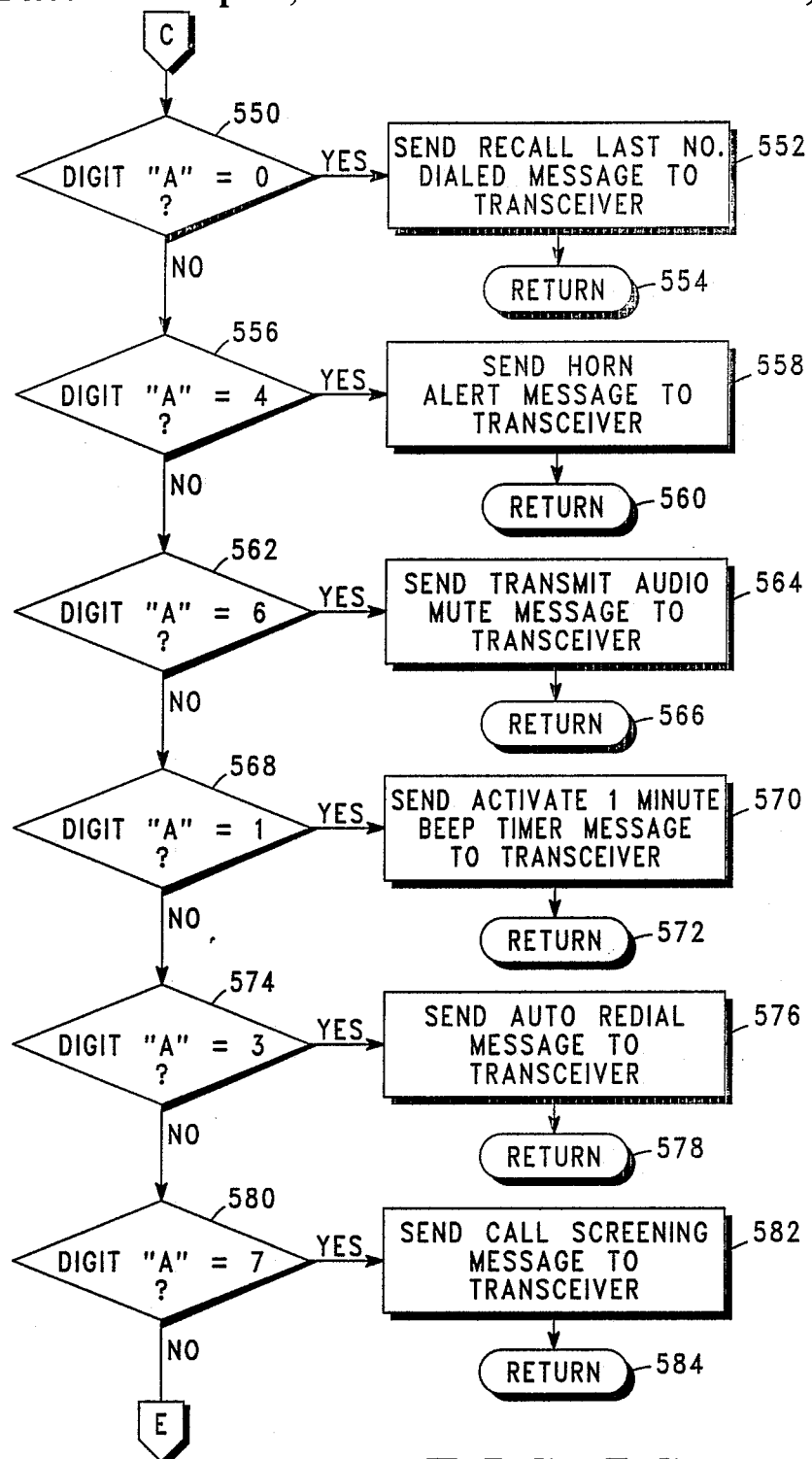
Figure 5D:
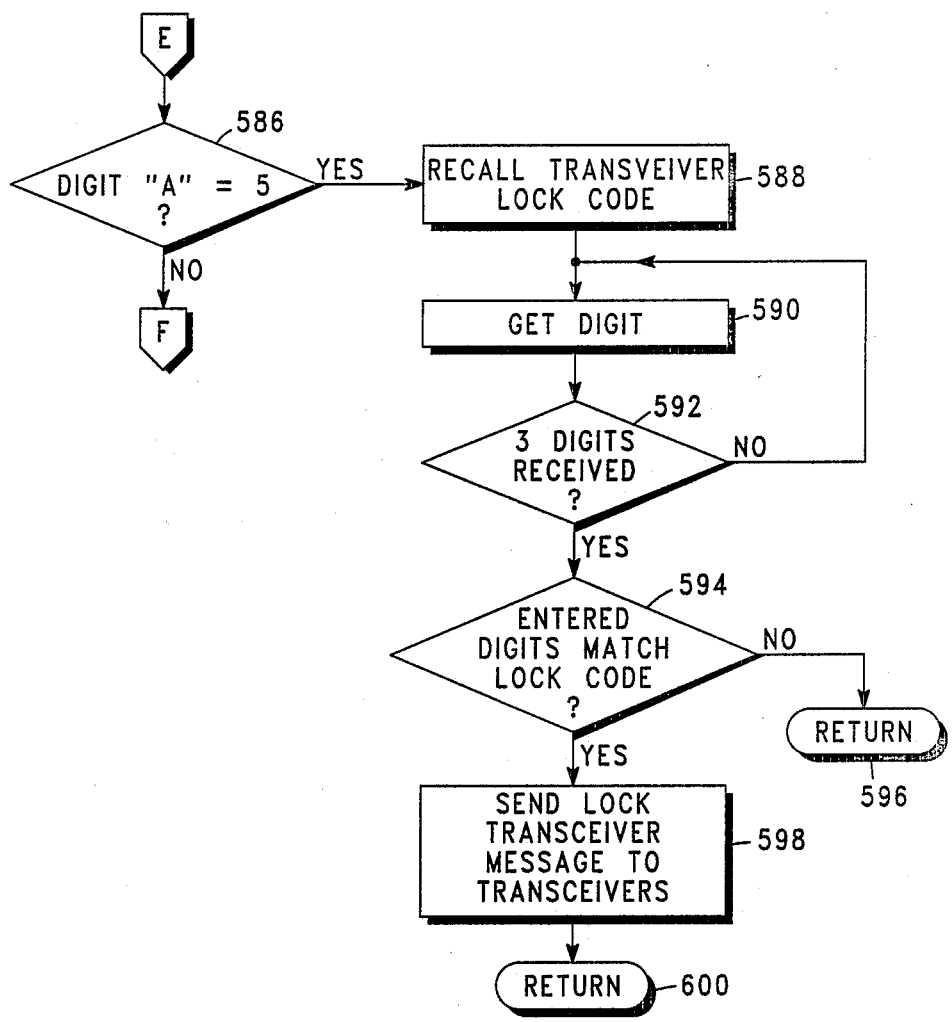
Figure 5E:
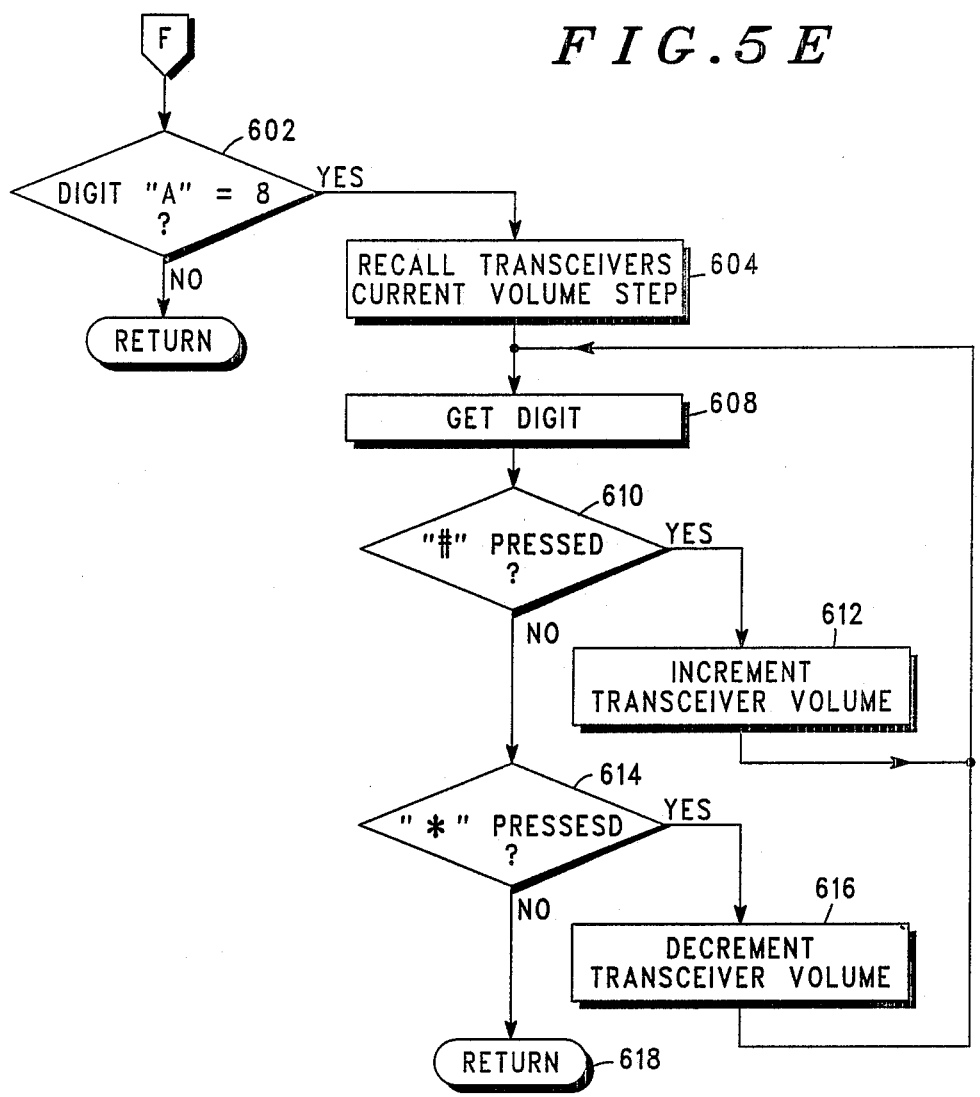

Referring to FIGS. 5C, 5D and 5E, there is illustrated the process for decoding the dialing sequence #,A,# for selecting the corresponding feature according to the table shown hereinabove. From block 526 in FIG. 5A, the process proceeds to decision block 550 in FIG. 5C, where a check is made to determine if the stored A digit is a zero. If so, YES branch is taken to block 552, where a recall last number dialed message is coded and sent via bus 111 to microcomputer 129 of radio transceiver 109, and thereafter the process returns to other tasks at block 554.

If the stored A digit is not a zero, NO branch is taken from decision block 550 to decision block 556, where a check is made to determine if the stored A digit is a four. If so, YES branch is taken to block 558, where a horn alert message is coded and sent via bus 111 to microcomputer 129 of radio transceiver 109, and thereafter the process returns to other tasks at block 560.

If the stored A digit is not a four, NO branch is taken from decision block 556 to decision block 562, where a check is made to determine if the stored A digit is a six. IF so, YES branch is taken to block 564, where a transmit audio mute message is coded and sent via bus 111 to microcomputer 129 of radio transceiver 109, and thereafter the process returns to other tasks at block 566.

If the stored A digit is not a six, NO branch is taken from decision block 562 to decision block 568, where a check is made to determine if the stored A digit is a one. If so, YES branch is taken to block 570, where an activate one-minute beep timer message is coded and sent via bus 111 to microcomputer 129 of radio transceiver 109, and thereafter the process returns to other tasks at block 572.

If the stored A digit is not a one, NO branch is taken from decision block 568 to decision block 574, where a check is made to determine if the stored A digit is a three. If so, YES branch is taken to block 576, where an automatic redial message is coded and sent via bus 111 to microcomputer 129 of radio transceiver 109, and thereafter the process returns to other tasks at block 578.

If the stored A digit is not a three, NO branch is taken from decision block 574 to decision block 580, where a check is made to determine if the stored A digit is a seven. If so, YES branch is taken to block 582, where a call screening message is coded and sent via bus 111 to microcomputer 129 of radio transceiver 109, and thereafter the process returns to other tasks at block 584.

If the stored A digit is not a seven, NO branch is taken from decision block 580 in FIG. 5C to decision block 586 in FIG. 5D, where a check is made to determine if the stored A digit is a five. If so, YES branch is taken to block 588, where the transceiver lock code stored in the memory of microcomputer 129 is recalled by a message transmitted via bus 111. Next, at block 590, a dialed digit of the lock code is received by microcomputer 108. Then, at decision block 592, a check is made to determine if three dialed digits of the lock code have been received. If not, NO branch is taken back to block 590 to get the next dialed digit. If three dialed digits of the lock code have been received, YES branch is taken from decision block 592 to decision block 594, where a check is made to determine if the three dialed digits match the transceiver lock code. If not, NO branch is taken to block 596 where the process returns to other tasks. If the three dialed digits match the transceiver lock code, YES branch is taken from decision block 594 to block 598, where a lock transceiver message is coded and sent via bus 111 to microcomputer 129 for electronically locking radio transceiver 109, and thereafter the process returns to other tasks at block 600.

If the stored A digit is not a five, NO branch is taken from decision block 586 in FIG. 5D to decision block 602 in FIG. 5E, where a check is made to determine if the stored A digit is an eight. If so, YES branch is taken to block 604, where the current radio receiver volume step stored in the memory of microcomputer 129 of radio transceiver 109 is recalled by a message transmitted via bus 111. Thereafter, the following dialed # and * digits are received by microcomputer 108 and cause the receiver volume step to be incremented and decremented, respectively. Next, at block 608, a dialed digit is received. Then, at decision block 610, a check is made to determine if the dialed digit is a # digit. If so, YES branch is taken to block 612, where the receiver volume step is incremented by one step and a volume step message is coded and transmitted via bus 111 to microcomputer 129 for raising the volume of the radio receiver. Thereafter, the process returns to block 608 to repeat the foregoing for the next dialed digit. If the dialed digit is not a # digit, NO branch is taken from decision block 610 to decision block 614, where a check is made to determine if the dialed digit is a * digit. If so, YES branch is taken to block 616, where the receiver volume step is decremented by one step and a volume step message is coded and transmitted via bus 111 to microcomputer 129 for decreasing the volume of the radio receiver. Thereafter, the process returns to block 608 to repeat the foregoing for the next dialed digit. If the dialed digit is not a * digit, NO branch is taken from decision block 614 to block 618 where the process returns to other tasks.

In summary, a unique cellular telephone automatically places and receives cellular telephone calls dialed in any pattern on a standard pulse or tone dial telephone set or equivalent device. The dialed digits of a telephone number are processed by the unique cellular telephone of on a real-time basis resulting in automatic placement of a cellular telephone call without using a "SEND" button or circuitry that simulates the "SEND" function as in the prior art. In addition, by using the dialing sequences of the present invention, a standard key telephone set or equivalent device may be used to select cellular telephone features.

We claim:

1. A method for selecting features of a cellular telephone including a telephone device having dialing means with at least ten numerical digits and at least one function digit, the cellular telephone including cellular transceiver means operable on cellular radio channels, and the cellular telephone including interface means coupling the standard telephone set to the cellular transceiver means, each feature of the cellular telephone corresponding to a dialing sequence having two of the function digits separated by at least one of the numerical digits, said method comprising the steps of:

in said interface means:
receiving each entered digit;
monitoring the received digits to detect one of the dialing sequences; and
transmitting a coded message to said cellular transceiver means when one of the dialing sequences has been detected, the coded message being coded to identify the feature corresponding to the detected one of the dialing sequences; and in said cellular transceiver means:
receiving the transmitted coded message from said interface means; and
selecting the feature of the cellular telephone corresponding to the received coded message.

2. The method according to claim 1, wherein said features include a memory store feature having a dialing sequence of two of the function digits separated by two of the numerical digits whereby the cellular transceiver means stores phone numbers in memory means thereof at a location determined by the two numerical digits, said method further including the steps of:

in said interface means:
detecting the predetermined dialing sequence of the memory store feature;
transmitting each succeeding received digit to said cellular transceiver means; and
transmitting a coded message to said cellular transceiver means when the elapsed time from receipt of the last received digit exceeds a predetermined time interval, the coded message being coded to identify the memory store feature; and in said cellular transceiver means:
receiving each transmitted digit from said interface means; and
storing the received digits in the location of the memory means determined by the dialing sequence of the selected memory store feature.

3. The method according to claim 1, wherein said features include an electronic lock feature having a predetermined dialing sequence whereby the cellular transceiver means is electronically locked by a preselected three-digit code, said method further including the steps of:

in said interface means:
detecting the predetermined dialing sequence of the electronic lock feature; and
transmitting a coded message to said cellular transceiver means when the succeeding received digits match the predetermined lock code, the coded message being coded to identify the electronic lock feature; and in said cellular transceiver means:
electronically locking the cellular transceiver means when the electronic lock feature has been selected.

4. The method according to claim 1, wherein said features include a volume control feature having a predetermined dialing sequence whereby the receiver volume of the cellular transceiver means is electronically incremented or decremented by first or second preselected digits, respectively, said method further including the steps of:

in said interface means:
detecting the predetermined dialing sequence of the volume control feature; and
transmitting a coded message to said cellular transceiver means when the succeeding received digit matches the first or second pre-selected digit, respectively, the coded message being coded to identify the volume control feature and increment or decrement the receiver volume of the cellular transceiver means when the succeeding received digit matches the first or second pre-selected digit, respectively; and in said cellular transceiver means:
incrementing or decrementing the receiver volume of the cellular transceiver means when the volume control feature has been selected.

5. A method for selecting features of a cellular telephone including a telephone device having dialing means with at least ten numerical digits and at least one function digit, the cellular telephone including cellular transceiver means operable on cellular radio channels, and the cellular telephone including interface means coupling the standard telephone set to the cellular transceiver means and having memory means, each feature of the cellular telephone corresponding to a dialing sequence having two of the function digits separated by one of the numerical digits, said method comprising the steps of:

in said interface means:
receiving each entered digit;
setting a feature flag signal when the first one of the received digits corresponds to the function digit;
storing, when the feature flag signal is set, the second one of the received digits in the memory means; and
transmitting a coded message to said cellular transceiver means when the feature flag signal is set and the third one of the received digits corresponds to the function digit, the coded message being coded to identify the feature corresponding to the dialing sequence represented by the first, second and third received digits; and in said cellular transceiver means:
receiving the transmitted coded message from said interface means; and
selecting the feature of the cellular telephone corresponding to the received coded message.

6. A method for selecting features of a cellular telephone including a telephone device having dialing means with at least ten numerical digits and at least one function digit, the cellular telephone including cellular transceiver means operable on cellular radio channels, and the cellular telephone including interface means coupling the standard telephone set to the cellular transceiver means and having memory means, each feature of the cellular telephone corresponding to a dialing sequence having two of the function digits separated by two of the numerical digits, said method comprising the steps of:

in said interface means:
receiving each entered digit;
setting a feature flag signal when the first one of the received digits corresponds to the function digit;
storing, when the feature flag signal is set, the second one and the third one of the received digits in the memory means; and
transmitting a coded message to said cellular transceiver means when the feature flag signal is set and the fourth one of the received digits corresponds to the function digit, the coded message being coded to identify the feature corresponding to the dialing sequence represented by the first, second, third and fourth received digits; and in said cellular transceiver means:
receiving the transmitted coded message from said interface means; and
selecting the feature of the cellular telephone corresponding to the received coded message.

7. A method for selecting features of a cellular telephone including a telephone device having dialing means with at least ten numerical digits and at least one function digit, the cellular telephone including cellular transceiver means operable on cellular radio channels, and the cellular telephone including interface means coupling the standard telephone set to the cellular transceiver means and having memory means, each feature of the cellular telephone corresponding to a dialing sequence having two of the function digits separated by one of the numerical digits, said method comprising the steps of:

in said interface means:
- receiving each entered digit;
- setting a feature flag signal when the first one of the received digits corresponds to the function digit;
- storing, when the feature flag signal is set, the succeeding ones of the received digits in the memory means; and
- transmitting a coded message to said cellular transceiver means when the feature flag signal is set and a succeeding one of the received digits corresponds to the function digit, the coded message being coded to identify the feature corresponding to the dialing sequence represented by the received digits stored in the memory means; and in said cellular transceiver means:
- receiving the transmitted coded message from said interface means; and
- selecting the feature of the cellular telephone corresponding to the received coded message.

8. A method for processing digits dialed on and selecting features of a cellular telephone including a telephone device having dialing means with at least ten numerical digits and at least one function digit, the cellular telephone including cellular transceiver means operable on cellular radio channels and having first memory means, and the cellular telephone including interface means coupling the standard telephone set to the cellular transceiver means and having second memory means, each feature of the cellular telephone corresponding to a dialing sequence having two of the function digits separated by at least one of the numerical digits said method comprising the steps of:

in said interface means:
- receiving each entered digit;
- setting a feature flag signal when the first one of the received digits corresponds to the function digit;
- storing, when the feature flag signal is set, the succeeding ones of the received digits in the first memory means; and
- transmitting a coded message to said cellular transceiver means when the feature flag signal is set and a succeeding one of the received digits corresponds to the function digit, the coded message being coded to identify the feature corresponding to the dialing sequence represented by the received digits stored in the first memory means; and
- transmitting, when the feature flag signal is not set, each received digit to said cellular transceiver means; and in said cellular transceiver means:
- receiving the transmitted coded message from said interface means;
- selecting the feature of the cellular telephone corresponding to the received coded message.
- receiving each transmitted digit from said interface means;
- storing each received digit in the second memory means; and
- transmitting the stored digits on one of the cellular radio channels when the elapsed time from receipt of the last stored digit exceeds a predetermined time interval.

* * * * *